United States Patent [19]
Lehman

[11] Patent Number: 5,518,156
[45] Date of Patent: May 21, 1996

[54] COOKER MOUNTING ASSEMBLY FOR ATTACHMENT TO A VEHICLE

[76] Inventor: Ronald L. Lehman, H.C.R. Box 42, Tribune, Kans. 67879

[21] Appl. No.: 280,112

[22] Filed: Jul. 25, 1994

[51] Int. Cl.$^6$ ....................................... B60R 9/06
[52] U.S. Cl. .......................... 224/281; 224/488; 224/502; 224/512; 224/554
[58] Field of Search ............................ 224/42.03, 42.07, 224/42.08, 42.31, 42.43, 42.44, 42.45, 281, 282, 42.32, 488, 489, 495, 497, 498, 502, 511, 512, 516, 521, 548, 551, 553, 554; 414/462, 463, 465, 466

[56] References Cited

U.S. PATENT DOCUMENTS

| | | | |
|---|---|---|---|
| 2,195,366 | 3/1940 | Haigh | 224/42.07 |
| 3,039,634 | 6/1962 | Hobson et al. | 224/516 |
| 3,202,332 | 8/1965 | Walker | 224/512 |
| 4,089,554 | 5/1978 | Myers | 224/498 |
| 4,241,858 | 12/1980 | Lawroski | 224/512 |
| 4,518,189 | 5/1985 | Belt | 224/42.32 |
| 4,915,276 | 4/1990 | Devito | 224/521 |
| 5,029,740 | 7/1991 | Cox | 224/42.44 |
| 5,037,162 | 9/1991 | Ransom | 224/42.44 |
| 5,232,135 | 8/1993 | Marren | 224/42.43 |
| 5,397,147 | 3/1995 | Ducharme | 224/403 |
| 5,439,151 | 8/1995 | Clayton | 224/521 |

FOREIGN PATENT DOCUMENTS

| | | | |
|---|---|---|---|
| 2501601 | 9/1982 | France | 224/310 |

*Primary Examiner*—Henry T. Hecla
*Assistant Examiner*—Gregory M. Vidovich
*Attorney, Agent, or Firm*—Phillip A. Rein

[57] ABSTRACT

A cooker mounting assembly operable to rotatably receive a charcoal cooker assembly thereon and readily connected to a portion of a vehicle for support. The cooker mounting assembly includes 1) a vehicle anchor assembly secured to a portion of the vehicle; 2) a telescoping support assembly connected to the vehicle anchor assembly operable to be moved from a storage transport to a usage position; and 3) a cooker support assembly mounted between the telescoping support assembly and the charcoal cooker assembly. The cooker support assembly allows for rotation of the charcoal cooker assembly to a desired usage and storage position. Another embodiment of the cooker mounting assembly provides a pivotal connector assembly which allows not only rotational adjustment but vertical adjustment of the charcoal cooker assembly.

11 Claims, 3 Drawing Sheets

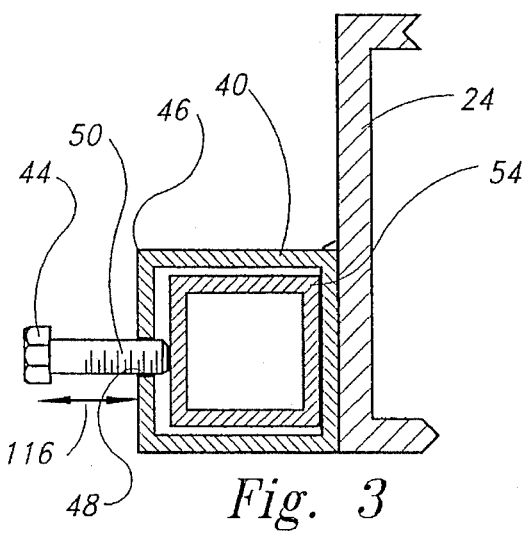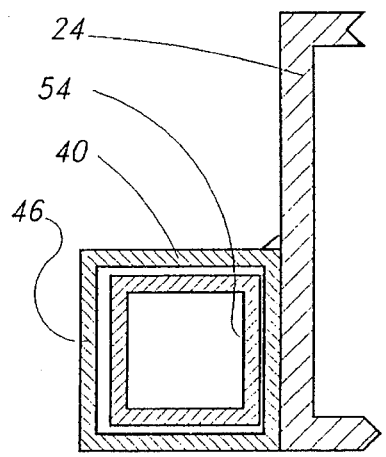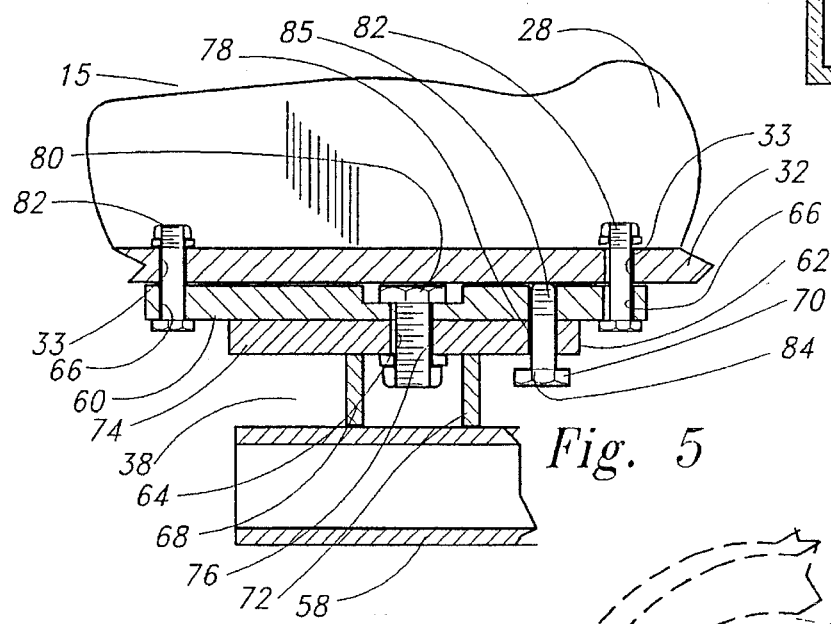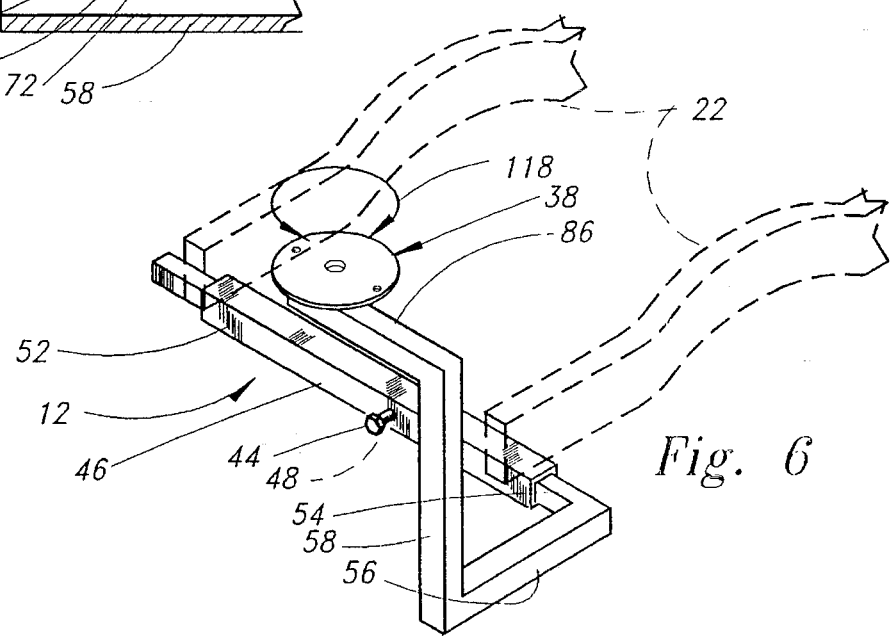

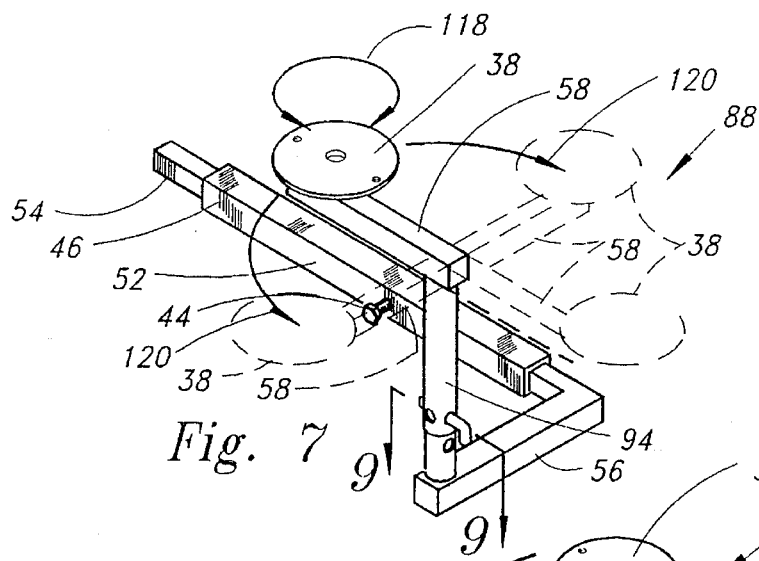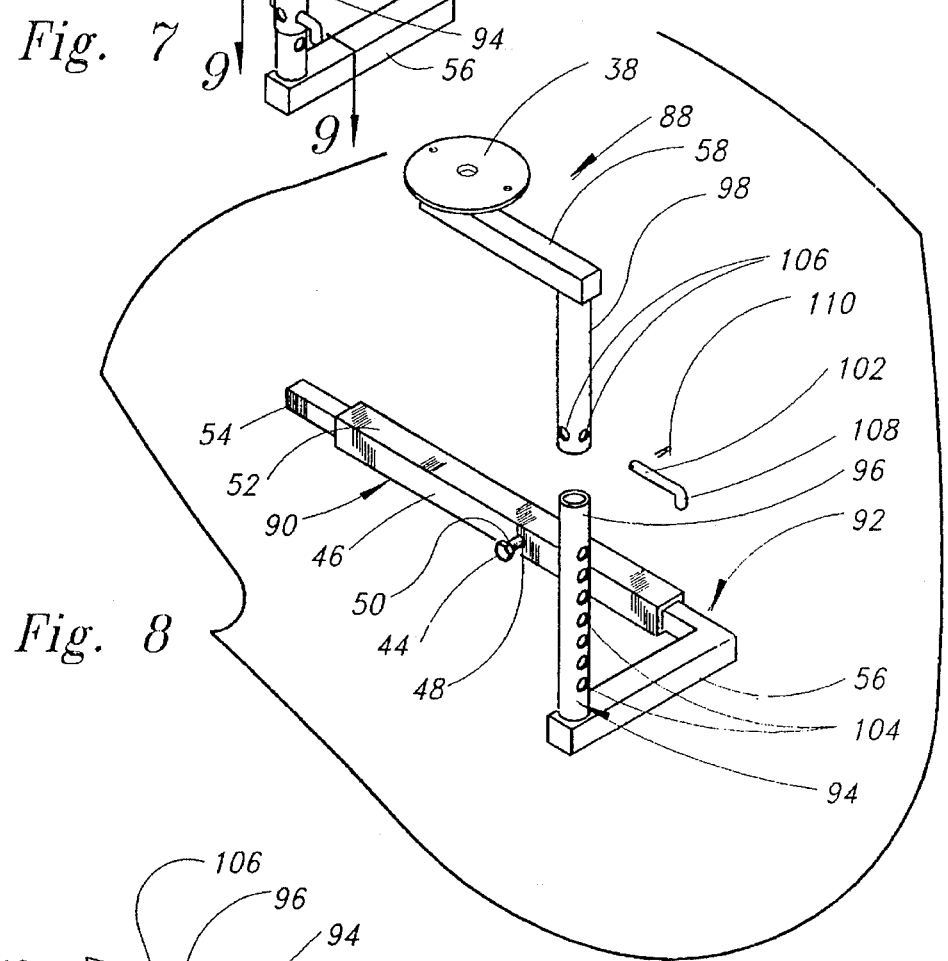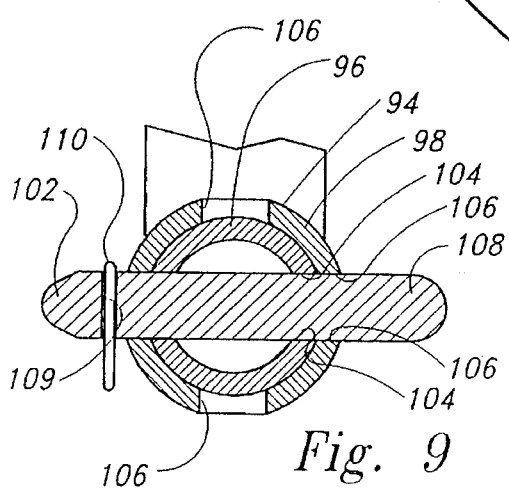

COOKER MOUNTING ASSEMBLY FOR ATTACHMENT TO A VEHICLE

PRIOR ART

A patent search was conducted on this invention and revealed the following pertinent United States patents:

| U.S. Pat. No. | Invention | Inventor |
|---|---|---|
| 3,809,425 | KITCHEN ACCESSORY FOR AUTOMOBILES | Anthony J. Blaschke |
| 4,089,554 | CAMPER COOKING AND DINING UNIT | Donald R. Myers |
| 4,501,457 | KITCHEN TABLE FOR CAMPER | Murray C. Pond |
| 4,993,610 | PROTECTIVE BOX BUMPER AND ASSOCIATED MOVABLE FRAME, ON VEHICLE | Abretske et al |
| 5,020,707 | COMPOUND HINGED TIRE CARRIER | Nozel et al |
| 5,104,015 | SPORT VEHICLE RACK AND METHOD THEREFOR | Bruce D. Johnson |
| 5,114,120 | PIVOTABLE EXTRAVEHICULAR EQUIPMENT MOUNTING SYSTEM | Bartelt et al |

Several of the references disclose retractable and/or removable steps for a camper body vehicle connected to a front portion of a vehicle bumper to provide a platform for doing maintenance work on the front windshield or the like. This particular feature is noted in the Antosh et al, McCrea, Kroft, Enos, Stevens, Robins, and McCafferty patent references.

The Blaschke patent discloses a kitchen accessory for automotors which is mounted on the top of an automotor in the storage condition and is moved outwardly on a tract assembly and through hinge members to place a cooking member laterally thereof.

The Myers patent discloses a camper cooking and dining unit having a stove which is moved outwardly from a folded storage condition for ease of usage.

The Pond patent discloses a kitchen table for a camper which foldable.

The Abretske et al and Nozel et al patents disclose hinged tire carriers which are pivotal outwardly and laterally of a side wall of the vehicle and having means for locking in a storage/transport condition.

The Johnson patent discloses a vehicle rack which is pivotal pivotal downwardly for usage.

The Bartelt et al patent discloses a pivotal equipment mounting system which discloses a hoist for the handicapped mountable on a pivot and pivoted laterally of the vehicle in the usage condition. The mounting system is operable to be pivoted to a position against a back wall of the vehicle and locked for storage and transporting functions.

PREFERRED EMBODIMENT OF THE INVENTION

In one preferred embodiment of this invention, a cooker mounting assembly for attachment to a vehicle and supporting a charcoal cooker assembly is provided to be anchored to a support frame member or rear bumper member on a motor home assembly, a pickup truck, or other similar vehicles.

The cooker mounting assembly includes 1) a vehicle anchor assembly for attachment to the support frame member or bumper member of the vehicle; 2) a telescoping support assembly connected to the vehicle anchor assembly; and 3) a cooker support assembly connected to the telescoping support assembly and operable to have the charcoal cooker assembly mounted thereon.

The vehicle anchor assembly includes a plurality of spaced anchor members which can be secured as by bolts or welding to a rear bumper member or a portion of an undercarriage support frame member of the vehicle.

Each spaced anchor member has a support body section preferably of square tubular shape in transverse cross section and at least one of the anchor members will have a side wall with an anchor hole therein to receive an anchor member, such as a threaded thumb screw, therein. This thumb screw will be used to anchor the telescoping support assembly in a given storage or usage position as will be noted.

The spaced anchor members are in axial alignment for receiving the telescoping support assembly therein.

As noted in FIGS. 6, 7, and 8, a second embodiment of the vehicle anchor assembly is provided having an elongated anchor member of a similar square tubular shape in transverse cross section. This single elongated anchor member will serve the same function as the spaced anchor members.

The elongated anchor member has a side wall with an anchor hole therein to receive the anchor member, being the thumb screw, therein for anchoring the telescoping support assembly in a given storage or usage position.

The telescoping support assembly includes 1) an elongated first tube member slidably mounted within the vehicle anchor assembly; 2) a second tube member secured to one end of the first tube member; and 3) a third tube member secured to an outer end of the second tube member.

As noted in FIGS. 1 and 2, interconnection of the first, second, and third tube members presents a generally J-shape structure having the first tube member axially movable within the vehicle anchor assembly.

The cooker support assembly is secured to an upper, outer end of the third tube member as by welding or the like and provides a rotatable support to the charcoal cooker assembly which can be locked in an adjusted position.

More particularly, the cooker support assembly includes a pivotal support plate member to receive the charcoal cooker assembly thereon and connected by a plate support and connector assembly mounted between the third tube member and a bottom wall of the charcoal cooker assembly.

The plate support and connector assembly includes 1) a plate support assembly; and 2) a connector assembly operable to interconnect the plate support assembly to the bottom wall of the charcoal cooker assembly and permit rotation thereof.

The plate support assembly includes a support tube having one end secured as by welding or the like to the third tube member and an upper end rigidly connected to a support plate as by welding or the like.

The connector assembly includes 1) a pivotal nut and bolt which is connected to the support plate and the pivotal support plate member which then permits rotational movement of the charcoal cooker assembly about the support plate and the plate support assembly; 2) anchor nut and bolts connected to the support plate of the support plate assembly and a bottom wall of the charcoal cooker assembly to provide a rigid interconnection therebetween; and 3) a threaded lock bolt extended through the support plate of the plate support assembly and engagable with the pivotal support plate member.

The lock bolt is operable on longitudinal movement in the threaded anchor hole to engage a bottom surface of the pivotal support plate member to hold in a desired position of rotation.

The cooker mounting assembly can be moved from the storage position of FIG. 1 laterally of a side wall of a motor home assembly to the position as noted in FIG. 2. The thumb screw can be tightened within the anchor member to hold in this usage position of FIG. 2.

Next, the lock bolt can be loosened so that the support plate of the plate support assembly may be rotated and then held in an adjusted rotated position by tightening of the lock bolt.

The second embodiment is noted in FIG. 6 whereupon the elongated anchor member is utilized with the vehicle anchor assembly and shows that the vehicle anchor assembly can be secured to undercarriage frame members of the vehicle.

The second embodiment includes 1) the first tube member; 2) the second tube member; 3) the third tube member; and 4) a fourth tube member which is extended in parallel planes with the first tube member.

An outer end of the fourth tube member is connected by the cooker support assembly to the charcoal cooker assembly as previously described in the first embodiment to allow rotation of the charcoal cooker assembly.

A third embodiment is illustrated in FIGS. 7–9, inclusive, being a rotatable cooker mounting assembly provided with the elongated anchor member with a telescoping support assembly connected to the elongated anchor member and an upper end of the telescoping support assembly is connected to the cooker support assembly.

The telescoping support assembly of the third embodiment includes a first tube member having an outer end connected to a second tube member which, in turn, is connected to a pivotal connector assembly, and an upper end of the pivotal connector assembly is connected by the cooker support assembly to the charcoal cooker assembly.

The pivotal connector assembly includes 1) a main support member of tubular shape having a lower end connected to a top outer wall of the second tube member as by welding; 2) a cylindrical support member operable to be telescopingly mounted over the main support member; and 3) an anchor member to secure the pivotal support member in a desired elevational and rotational position on the main support member.

The main support member is provided with a plurality of spaced vertically aligned anchor holes therein. A lower end of the pivotal support member is provided with a plurality, namely four, spaced lock holes positioned on a common horizontal plane and 90 degrees from adjacent ones thereof.

The pivotal support member is operable to be rotated about the main support member to align the spaced anchor holes and the spaced lock holes operable to receive the anchor member to hold in the rotatable and vertically adjustable position.

OBJECTS OF THE INVENTION

One object of this invention is to provide a cooker mounting assembly to receive a charcoal cooker assembly thereon to be mounted on undercarriage frame members or a rear bumper on a vehicle, such as a motor home assembly, which can be moved from a secured locked storage position outwardly of a side wall of the motor home assembly for usage thereof.

One other object of this invention is to provide a cooker mounting assembly to support a charcoal cooker assembly thereon including 1) a vehicle anchor assembly secured to a portion of a vehicle; 2) a telescoping support assembly connected to the vehicle anchor assembly to move the charcoal cooker assembly from a storage position within the confines of the side walls of the vehicle; and 3) a cooker support assembly mounted between the telescoping support assembly and the charcoal cooker assembly providing for rotational movement of the charcoal cooker assembly to any desired usage position.

Another object of this invention is to provide a cooker mounting assembly mountable on a vehicle, such as a motor home assembly, to a rear bumper member or undercarriage frame members whereby the charcoal cooker assembly can be moved laterally of a side wall of the vehicle to a usage position, can be rotated 360 degrees and can be adjustable vertically to place the charcoal cooker assembly at a desired selected height.

Still, one other object of this invention is to provide a cooker mounting assembly to receive and support a rotatable charcoal cooker assembly which is economical to manufacture; securely locked in a transport position; sturdy in construction; and substantially maintenance free.

Various other objects, advantages, and features of the invention will become apparent to those skilled in the art from the following discussion, taken in conjunction with the accompanying drawings, in which:

FIGURES OF THE INVENTION

FIG. 3 is an enlarged fragmentary sectional view taken along line 3—3 in FIG. 1;

FIG. 4 is an enlarged fragmentary sectional view taken along line 4—4 in FIG. 1;

FIG. 5 is an enlarged fragmentary sectional view taken along line 5—5 in FIG. 1;

FIG. 6 is a perspective view of a second embodiment of the cooker mounting assembly as attached to undercarriage frame members on a vehicle;

FIG. 7 is a perspective view of a third embodiment being a vertically adjustable cooker mounting assembly;

FIG. 8 is an exploded perspective view of the third embodiment as shown in FIG. 7; and FIG. 9 is an enlarged fragmentary sectional view taken along line 9—9 in FIG. 7.

Figure 1:
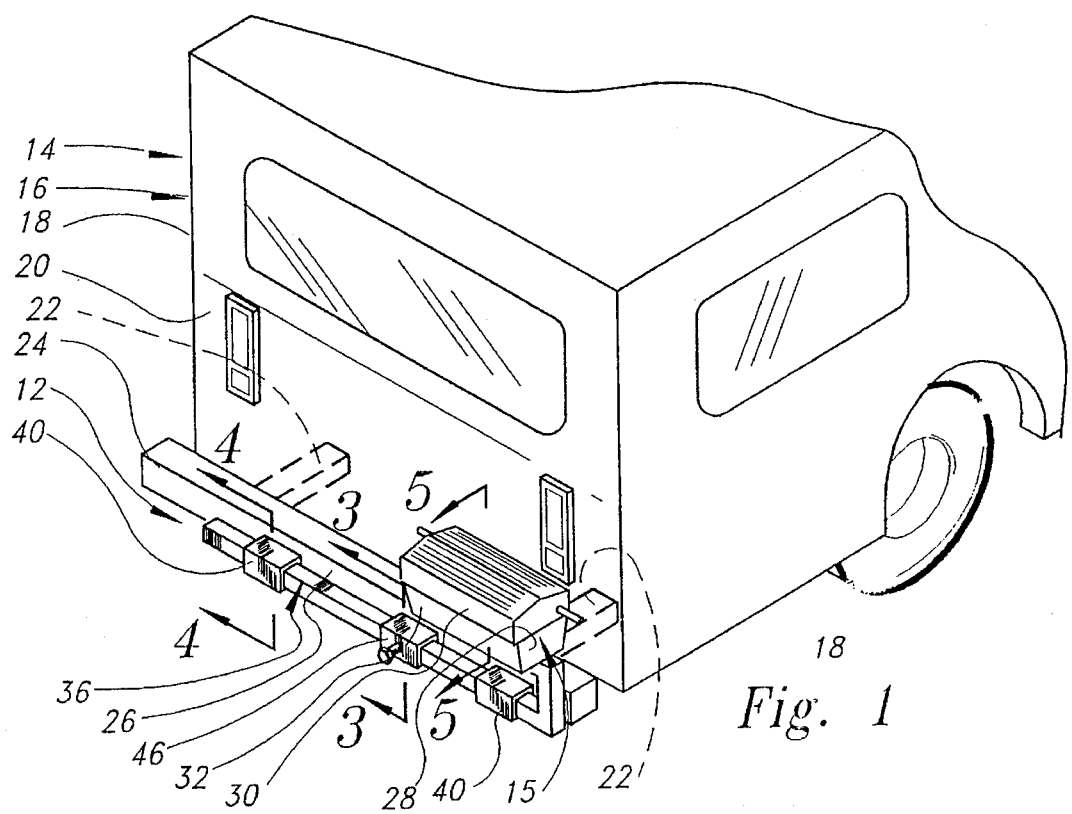
FIG. 1 is a fragmentary perspective view of a rear portion of a motor home assembly having a cooker mounting assembly of this invention mounted thereon supporting a charcoal cooker assembly.

The following is a discussion and description of preferred specific embodiments of the cooker mounting assembly for attachment to a vehicle of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail, and in particular to FIG. 1, a cooker mounting assembly, indicated generally at 12, is illustrated as mounted on a vehicle, such as a motor home assembly 14, and connected to a charcoal cooker assembly 15.

The cooker mounting assembly 12 is illustrated as mounted on a motor home assembly 14 but could be mounted on other types of vehicles such as a pickup truck, a rear portion of a boat member, or the like.

The motor home assembly 14 includes a rear vehicle assembly 16 having 1) opposed side wall members 18; 2) a back wall member 20 connected to the side wall members 18; 3) undercarriage frame members 22; and 4) a rear bumper member 24.

The rear bumper member 24 is provided with a rear support wall 26 to which the cooker mounting assembly 12 can be attached as will be described.

The charcoal cooker assembly 15 is of a conventional nature including a main cooker support body 28 having a top cover lid member 30 pivotally connected thereto.

The main cooker support body 28 is provided with a bottom wall member 32 having spaced anchor holes 33 therein for connecting to the cooker mounting assembly 12.

The use and operation of the charcoal cooker assembly 15 and other elements thereof are not deemed pertinent to the applicant's claimed invention.

The cooker mounting assembly 12 includes 1) a vehicle anchor assembly 34 for attachment to the undercarriage frame members 22 or rear bumper member 24 of a vehicle; 2) a telescoping support assembly 36 connected to the vehicle anchor assembly 34 for adjustable movement; and 3) a cooker support assembly 38 connected to the telescoping support assembly 36 and the charcoal cooker assembly 15 in a manner to be explained.

The vehicle anchor assembly 34 is provided with a plurality, namely three as illustrated, spaced anchor members 40 to be secured to the undercarriage frame members 22 or the rear bumper member 24 by connecting means such as welding, use of nut and bolt members, or the like.

Each spaced anchor member 40 is preferably of a square or rectangular shape in transverse cross section being of tubular construction to have a central opening 41 therein.

One or more of the spaced anchor members 40 are provided an anchor or lock member 44 for securing to the telescoping support assembly 36.

As noted in FIG. 3, each spaced anchor member 40 includes a support body section 42 having an outer side wall 46 which may be provided with a threaded anchor hole 48 to receive the anchor member 44 therein.

The anchor member 44 is preferably a threaded bolt member or a thumb screw 50 which can be threadably mounted within the anchor hole 48 in the side wall 46 to engage a portion of the telescoping support assembly 36 and hold locked in a storage or outward usage position of the charcoal cooker assembly 15.

A second embodiment of the vehicle anchor assembly 34 is illustrated in FIG. 6 whereupon the spaced anchor members 40 have been consolidated into a single elongated anchor member 52.

The elongated anchor member 52 can be attached to the undercarriage frame members 22 as noted in FIG. 6 or secured to the rear bumper member 24 of a vehicle as by welding, nut and bolt members, or the like.

The elongated anchor member 52 is provided with a side wall 46 having a threaded anchor hole 48 to receive the anchor member 44 therein for locking in the stored transport position or the outward usage position of the charcoal cooker assembly 15.

Figure 2:
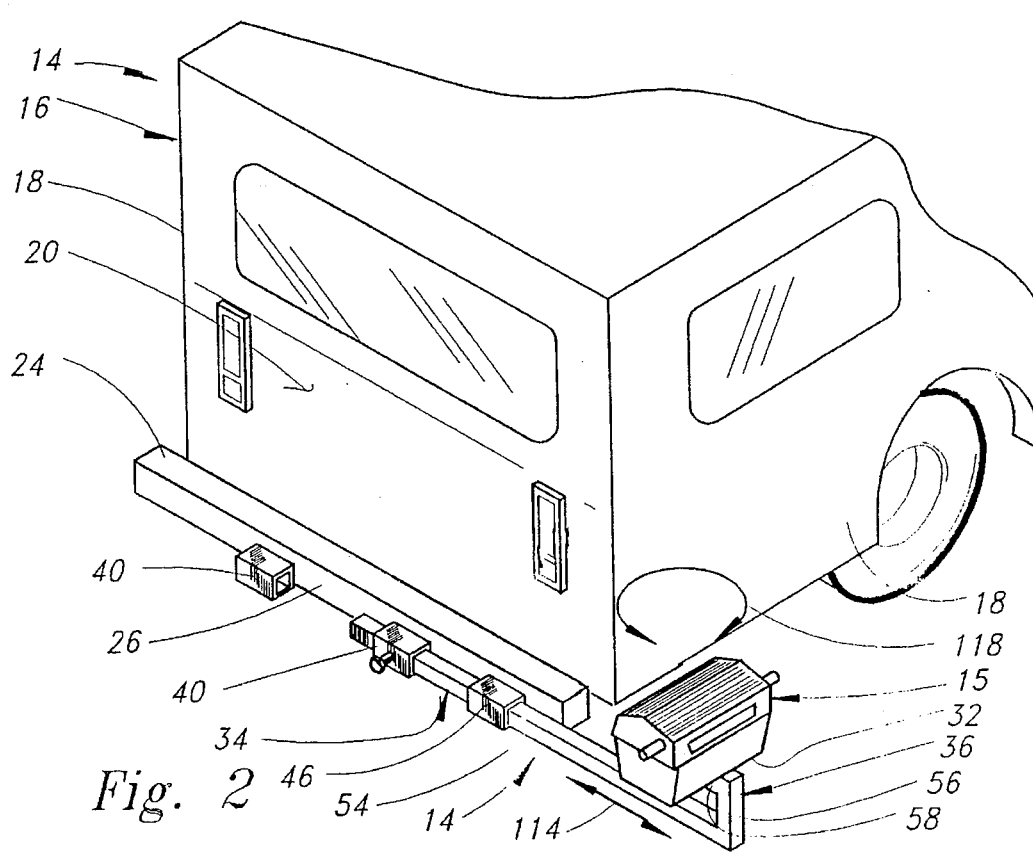
FIG. 2 is a view similar to FIG. 1 illustrating the cooker mounting assembly with the charcoal cooker assembly mounted thereon moved outwardly into a usage position laterally of a side wall of the motor home assembly.

As noted in FIG. 2, the telescoping support assembly 36 includes a first tube member 54 having an outer end connected to a second tube member 56 which, in turn, has an upper end thereof connected to a third tube member 58. The tube members 54, 56, and 58 can be secured to each other as by welding and preferably of square or rectangular shape in transverse cross section.

The tube members 54, 56, and 58 present a telescoping support assembly 36 of a generally J-shape as noted in FIG. 2 or can be modified as shown by a second embodiment in FIG. 6 which will be described in detail.

The cooker support assembly 38, which is best described in FIG. 5, includes a pivotal support plate member 60 which is interconnected to the charcoal cooker assembly 15 and an outer end portion of the third tube member 58 by a plate support and connector assembly 62.

The pivotal support plate member 60 is preferably of circular shape having therein a central connector hole or opening 64 and a pair of spaced cooker anchor holes or openings 66.

The plate support and connector assembly 62 includes a plate support assembly 68 mounted between the outer, upper end of the third tube member 58 and includes a connector assembly 70 operable to interconnect the plate support assembly 68 to the charcoal cooker assembly 15.

The plate support assembly 68 includes a support tube 72 having one end secured as by welding to an upper surface of the third tube member 58 and having an upper end of the support tube 72 secured to a support plate 74.

The support tube 72 can be of a circular, square, or rectangular tube construction mainly providing a spacing between the third tube member 58 and the charcoal cooker assembly 15.

The support plate 74 is preferably of a circular plate construction having a central hole 76 and a threaded anchor hole 78 for reasons to be explained.

The connector assembly 70 includes 1) a pivotal nut and bolt 80 mounted through the central hole 76 in the support plate 74 and the central connector opening 64 in the pivotal support plate member 60; 2) anchor nut and bolts 82 mounted in respective ones of the cooker anchor holes 66 and the spaced anchor holes 33 in the bottom wall 32 of the charcoal cooker assembly 15; and 3) a lock bolt 84 which is mounted within the threaded anchor hole 78 in the support plate 74.

The pivotal nut and bolt 80 needs to be provided with a lock nut which is not tightly mounted on a bolt member so as to allow relative rotational movement of the interconnected pivotal support plate member 60 and charcoal cooker assembly 15 about the stationary support plate 74.

The lock bolt 84 has an outer contact end section 85 which, on longitudinal movement within the threaded anchor hole 78, engages a bottom surface of the pivotal support plate member 60 to anchor in a given adjustable rotational position.

In the second embodiment of the cooker mounting assembly 12 as noted in FIG. 6, we are utilizing the elongated anchor member 52 of a one-piece construction having the side wall 46 with an anchor hole 48 to receive the anchor member 44 therein.

The second embodiment of the cooker mounting assembly 12 utilizes the previously described cooker support assembly 38 having a modification of the telescoping support assembly 36 by adding an additional fourth tube member 86 thereto.

The telescoping support assembly 36 includes the first tube member 54, the second tube memember 56, and the third tube member 58 in conjunction with the fourth tube member 86.

The first tube member 54 and second tube member 56 are formed of a generally L-shape construction extended in a horizontal plane.

The second tube member 56 and interconnected third tube member 58 are also of a generally L-shape construction in a vertical plane.

The third embodiment of this invention is noted in FIGS. 7, 8, and 9 being a vertically adjusted cooker mounting assembly 88. The vertically adjusted cooker mounting assembly 88 includes 1) a vehicle anchor assembly 90 connectable to the undercarriage frame members 22 or rear bumper member 24 of a vehicle; 2) a telescoping support assembly 92 connected to and laterally movable relative to the vehicle anchor assembly 90; and 3) the cooker support assembly 38 mounted between the telescoping support assembly 92 and the charcoal cooker assembly 15.

The vehicle anchor assembly 90 is as described in FIG. 6 having the elongated anchor member 52 provided with a side wall 46 having an anchor hole 48 to receive the anchor member 44 therein, namely, the thumb screw 50 is threadably mounted therein.

The telescoping support assembly 92 includes the first tube member 54 having an outer end connected to the second tube member 56 which, in turn, is connected to a pivotal connector assembly 94 having an upper end connected to the third tube member 58.

The modification of the third embodiment of the vertically adjusted cooker mounting assembly 88 mainly lies in the use of the pivotal connector assembly 94 which allows for 360 degree rotational adjustment and vertical height adjustment of the charcoal cooker assembly 15.

The pivotal connector assembly 94 includes 1) a main support member 96 of tubular construction having a lower end thereof secured as by welding to an outer end of the second tube member 56; 2) a pivotal support member 98 of tubular construction operable to be telescopingly mounted on and about the main support member 96; and 3) an anchor member 102 operable to lock the pivotal support member 98 to the main support member 96 as will be explained.

The main support member 96 has a plurality of vertically aligned anchor holes 104 to receive the anchor member 102 therethrough.

The pivotal support member 98 is of a size slightly greater than the diameter of the main support member 96 so as to be telescopingly mounted thereon as noted in FIG. 7.

The pivotal support member 98 is provided with a plurality of spaced lock holes 106 in a common horizontal plane and positioned at 90 degrees to adjacent ones thereof.

The anchor holes 102 and spaced lock holes 106 are operable to be aligned in a selected rotational and elevational positions and secured by the anchor member 102 as will be described.

The anchor member 102 includes a lock pin 108 and an anchor clip 110. The lock pin 108 is provided with an outer lock groove 109 to receive the anchor clip 110 therein as noted in FIG. 9.

The 90 degree spacing of the lock holes 106 is operable to receive the lock pin 108 therethrough as clearly noted in FIG. 9.

USE AND OPERATION OF THE INVENTION

In the use and operation of the cooker mounting assembly 12 of this invention, we will assume the mounted position of FIG. 1 shown as attached to the rear bumper member 24 of the motor home assembly 14. The spaced anchor members 40 have been secured to the rear bumper member 24 as by welding, nut and bolt members, or the like.

In the position of FIG. 1, the cooker mounting assembly 12 and attached charcoal cooker assembly 15 are in the retracted transport position whereupon the charcoal cooker assembly 15 is completely within the confines of the side wall members 18 of the motor home assembly 14.

In this transport position, it is obvious that the thumb screw 50 has been rotated inwardly to contact the side wall 46 of the first tube member 54 in a locked position as noted in FIG. 3. It is also obvious that a hole could be provided in the outer side wall 46 of the first tube member 54 if a more secure locking feature is desirable, not relying on frictional contact only.

Upon the vehicle operator placing the motor home assembly 14 in a desired location and wanting to utilize the charcoal cooker assembly 15, the anchor bolt or thumb screw 50 may be unscrewed from the anchor member 40. This would then allow the vehicle operator to move the telescoping support assembly 36 laterally of the side wall members 18 of the motor home assembly 14 as noted by an arrow 114.

On reaching this usage position, the anchor member 44 can be tightened to anchor outwardly in this position for use of the charcoal cooker assembly 15.

With the cooker support assembly 38 as previously described, it is obvious that the lock bolt 84 may be unscrewed from its threaded anchor hole 78 in the support plate 74. This, then, allows the pivotal support plate member 60 and attached charcoal cooker assembly 15 to be freely rotated to a desired position as noted by an arrow 118 in FIG. 2.

The vehicle operator could then re-tighten the lock bolt 84 in the threaded anchor hole 78 if it was desired to anchor the charcoal cooker assembly 15 in a desired rotational position.

Use and operation of the second embodiment, illustrated in FIG. 6, is substantially identical to the first embodiment and is provided with the fourth tube member 86 so as to position the charcoal cooker assembly 15 further inwardly of the adjacent side wall member 18 of the motor home assembly 14.

As noted in FIGS. 7 and 8, the third embodiment, being the vertically adjusted cooker mounting assembly 88, is not only operable to position the charcoal cooker assembly 15 in a position similar to the embodiment of FIG. 6 but there is a 360 degree rotational and vertically adjustable feature.

As noted in FIG. 7 and as shown in dotted lines, the third tube member 58 and interconnected cooker support assembly 38 can be rotated and anchored in increments of 90 degrees as indicated by an arrow 120.

The rotational chosen position as indicated by arrow 120 can then be anchored in this position through use of the anchor member 102 placed through aligned ones of the anchor holes 104 and lock holes 106 as best noted in FIG. 9.

Further, the vertically adjusted cooker mounting assembly 88 is operable to have the pivotal support member 98 movable vertically as noted by an arrow 122 to raise and lower the interconnected charcoal cooker assembly 15 to a desired height as illustrated in FIG. 7. The pivotal support member 98 has been anchored in the given vertical position as shown by the arrow 122 and held in this position through use of the anchor member 102.

The anchor clip 110 holds the lock pin 108 in the locked position within aligned ones of the spaced anchor holes 104 and the lock holes 106 as noted in FIG. 9.

As noted in FIG. 7, the pivotal support member 98 has been elevated to a second set of aligned ones of the anchor holes 104 in the main support member 96 and held in this elevated position by the anchor member 44.

In the embodiment of FIGS. 7 and 8, it is obvious that the charcoal cooker assembly 15 can be mounted on the cooker support assembly 38 as previously described for the first embodiment and being rotatable 360 degrees as noted by the arrow 118.

The cooker mounting assembly 12 is operable to support a charcoal cooker assembly 15 thereon which is rotatable 360 degrees and interconnected by a telescoping support assembly 36 to a vehicle anchor assembly 34 so as to be readily movable from a rigid storage transport position outwardly to an easy of usage condition for conducting a charcoal cooking operation on a charcoal cooker assembly 15.

The cooker mounting assembly of this invention is readily attachable to portions of a vehicle, such as a rear bumper member, undercarriage frame members, or the like so as to be secure for transporting purposes and readily movable to a usage position.

The cooker mounting assembly is sturdy in construction; easy to use; readily mountable to a vehicle not requiring skilled labor; easily moved from a retracted transport position to an outer charcoal cooking position; economical to manufacture; and substantially maintenance free.

While the invention has been described in conjunction with preferred specific embodiments thereof, it will be understood that this description is intended to illustrate and not to limit the scope of the invention, which is defined by the following claims:

I claim:

1. A cooker mounting assembly adapted to support a charcoal cooker assembly on a vehicle, comprising:

a) a vehicle anchor assembly adapted to be connected to a longitudinal end of the vehicle;

b) a support assembly connected to said vehicle anchor assembly and movable relative thereto;

c) said support assembly is axially slidable and adjustably movable relative to said vehicle anchor assembly along an axis substantially transverse to a longitudinal axis of the vehicle; and d) a cooker support assembly connected to said support assembly adapted to have the charcoal cooker assembly mounted thereon;

whereby said support assembly is movable along said transverse axis from a locked transport position located adjacent to the vehicle to an extended cooking position located laterally away from the vehicle.

2. A cooker mounting assembly as described in claim 1, wherein:

a) said vehicle anchor assembly includes an anchor member having a portion of said support assembly mounted therein for axial movement;

b) said anchor member having a support body section with lock anchor member mounted thereon; and c) said lock anchor member operable to engage a portion of said support assembly to hold in the locked transport position and moved to a released position to allow said support assembly to be moved adjustably outwardly to the extended cooking position.

3. A cooker mounting assembly as described in claim 1, wherein:

a) said vehicle anchor assembly includes a plurality of spaced anchor members of tubular shape in transverse cross section;

b) said support assembly having a first tube member of tubular shape in transverse cross section;

c) said first tube member is telescopingly mounted within said spaced anchor members for longitudinal and axial movement relative thereto; and d) said support assembly selectively movable from the locked transport position to the extended cooking position.

4. A cooker mounting assembly as described in claim 1, wherein:

a) said vehicle anchor assembly having an anchor member adapted to be secured to the vehicle;

b) said support assembly having a first tube member integral with a vertically extended second tube member which, in turn, is integral with a laterally extended third tube member;

c) said cooker support assembly is pivotally connected to an outer end of said third tube member; and d) said first tube member is telescoping mounted in said anchor member and axially movable relative thereto to position the charcoal cooker assembly in the locked transport position adjacent the vehicle and selectively movable to said extended cooking position being lateral of the vehicle.

5. A cooker mounting assembly adapted to support a cooker assembly on a vehicle for movement from a storage transport position to a usage cooking position, comprising:

a) a vehicle anchor assembly adapted to be connected to a support member on the vehicle:

b) a support assembly releasably connected to said vehicle anchor assembly and selectively movable axially from a storage transport position to a usage cooking position:

c) said support assembly includes a first tube member slidably and telescopingly mounted in said vehicle anchor assembly; a second tube member connected to and extended substantially transverse of said first tube member; and a third tube member connected to and extended substantially transverse of said second tube member; and d) a cooker support assembly rotatably connected to said third tube member; and e) adapted to have a cooker assembly pivotally mounted on said cooker support assembly;

whereby said cooker assembly is movable from the storage transport position adjacent the vehicle to the usage cooking position laterally of the vehicle for ease of usage and fire safety reasons.

6. A cooker mounting assembly as described in claim 5, wherein:

a) said vehicle anchor assembly includes an elongated anchor member adapted to be connected to a portion of the vehicle;

b) said elongated anchor member having a side wall with a threaded hole having a lock anchor member therein with said lock anchor member movable into engagement with a portion of said support assembly to anchor in either the storage transport position or the usage cooking position;

c) said cooker support assembly include a support plate member connectable to the charcoal cooker assembly and a plate support and connector assembly interconnects said support plate member to said third tube member; and d) said support plate member is rotatable about said third tube member with the charcoal cooker assembly mounted thereon.

7. A cooker mounting assembly adapted to support a charcoal cooker assembly on a vehicle, comprising:

a) a vehicle anchor assembly adapted to be connected to the vehicle;

b) a support assembly connected to said vehicle anchor assembly and movable relative thereto;

c) a cooker support assembly connected to said support assembly adapted to have the charcoal cooker assembly mounted thereon:

d) said vehicle anchor assembly having an anchor member adapted to be secured to the vehicle;

e) said support assembly having a first tube member integral with a second tube member which, in turn, is integral with a third tube member;

f) said cooker support assembly is pivotally connected to an outer end of said third tube member;

g) said first tube member telescopingly mounted in said anchor member and axially movable relative thereto to position the charcoal cooker assembly in a locked transport position adjacent the vehicle and selectively movable to a laterally extended cooking position being lateral of the vehicle;

h) said cooker support assembly includes a support plate member connectable to the charcoal cooker assembly and a plate support and connector assembly interconnects said support plate member to said third tube member;

i) said plate support and connector assembly includes a plate support assembly connected to said third tube member by a connector assembly; and j) said support plate member with the charcoal cooker assembly mounted thereon is rotatable about said plate support assembly about a vertical axis;

whereby said support assembly is movable from the locked transport position to the extended cooking position.

8. A cooker mounting assembly as described in claim 7, wherein:

said connector assembly includes a lock bolt threadably mounted for longitudinal movement in said plate support assembly and engagable with said support plate member to hold in a given desired rotational position.

9. A cooker mounting assembly adapted to support a charcoal cooker assembly on a vehicle, comprising:

a) a vehicle anchor assembly adapted to be connected to the vehicle;

b) a support assembly connected to said vehicle anchor assembly and movable relative thereto;

c) said vehicle anchor assembly having an anchor member adapted to be secured to the vehicle;

d) said support assembly having a first support member connected to a laterally extended second support member;

e) a cooker support assembly is rotatably connected to an outer end of said second support member;

f) said first support being member mounted in said anchor member and being axially movable relative thereto to position said charcoal cooker assembly in a locked transport position adjacent the vehicle and selectively movable to a laterally extended cooking position being lateral of the vehicle; and g) a charcoal cooker assembly mounted to said cooker support assembly;

whereby said support assembly is movable from a locked transport position to an extended cooking position.

10. A cooker mounting assembly as described in claim 9, wherein:

a) said cooker support assembly includes a support plate member connectable to said charcoal cooker assembly and a plate support and connector assembly interconnects said support plate member to said second support member; and b) said support plate member with the charcoal cooker assembly mounted thereon is adjustably rotatable about said plate support and connector assembly about a vertical axis.

11. A cooker mounting assembly as described in claim 10, wherein:

a) said plate support and connector assembly includes a plate support assembly connected to said second support member by a connector assembly; and b) said connector assembly includes a lock bolt threadably mounted for longitudinal movement in said plate support assembly and engagable with said support plate member to hold in a given desired rotational position;

* * * * *